US010597153B1

(12) United States Patent
Schuller

(10) Patent No.: US 10,597,153 B1
(45) Date of Patent: Mar. 24, 2020

(54) HELIPLANE CRAFT

(71) Applicant: Warren F Schuller, Freedom, CA (US)

(72) Inventor: Warren F Schuller, Freedom, CA (US)

( * ) Notice: Subject to any disclaimer, the term of this patent is extended or adjusted under 35 U.S.C. 154(b) by 0 days.

(21) Appl. No.: 16/685,052

(22) Filed: Nov. 15, 2019

(51) Int. Cl.
*B64C 29/02* (2006.01)
*B64D 27/24* (2006.01)
*B60L 50/60* (2019.01)
*B64C 9/02* (2006.01)
*B64C 13/04* (2006.01)
*B64C 11/48* (2006.01)
*B64C 25/06* (2006.01)
*B64C 13/22* (2006.01)
*B64C 1/14* (2006.01)
*B64C 1/06* (2006.01)

(52) U.S. Cl.
CPC .............. *B64C 29/02* (2013.01); *B60L 50/66* (2019.02); *B64C 9/02* (2013.01); *B64C 11/48* (2013.01); *B64C 13/04* (2013.01); *B64C 13/22* (2013.01); *B64C 25/06* (2013.01); *B64D 27/24* (2013.01); *B64C 1/0683* (2020.01); *B64C 1/1469* (2013.01); *B64C 1/1484* (2013.01)

(58) Field of Classification Search
CPC ........... B64C 29/02; B64C 9/02; B64C 11/48; B64C 13/04; B64C 13/22; B64C 25/06; B60L 50/66; B64D 27/24
See application file for complete search history.

(56) References Cited

U.S. PATENT DOCUMENTS

| | | | | | |
|---|---|---|---|---|---|
| 2,622,826 | A | * | 12/1952 | Prince | B64C 29/02 244/7 B |
| 3,116,040 | A | * | 12/1963 | Thracy | B64C 27/18 244/17.13 |
| 3,350,035 | A | * | 10/1967 | Schlieben | B64C 29/02 244/7 R |
| 4,537,372 | A | * | 8/1985 | Forizs | B64C 29/0033 244/12.4 |
| 5,289,994 | A | * | 3/1994 | Del Campo Aguilera | B64C 27/22 244/12.1 |
| 6,561,455 | B2 | * | 5/2003 | Capanna | B64C 29/02 244/7 A |
| 8,146,854 | B2 | * | 4/2012 | Lawrence | B64C 39/024 244/17.23 |
| 8,991,751 | B2 | * | 3/2015 | Page | B64C 29/02 244/78.1 |

(Continued)

*Primary Examiner* — Justin M Benedik
(74) *Attorney, Agent, or Firm* — Donald R. Boys; Central Coast Patent Agency LLC

(57) ABSTRACT

An aircraft has a substantially cylindrical body having a longitudinal axis, a cockpit, counter-rotating propellers of an overall diameter substantially greater than a maximum diameter of the body, DC motors powering the propeller sets, a battery compartment at a lower extremity of the cylindrical body, enclosing a DC battery, fixes wings extending a substantial distance away from the cylindrical body in a first direction, a rudder in a plane parallel to the axis of the cylindrical body, landing struts extending from a lower and outer extremity of each wing and of the providing a support structure for the aircraft; and controls operable to move the rudder and the wing flaps, and to manage power and rpm of the counter rotating propellers. The aircraft may lift vertically in hovering flight, transition to level flight, and return to hovering flight to land again.

6 Claims, 9 Drawing Sheets

(56) References Cited

U.S. PATENT DOCUMENTS 9,567,079 B2 * 2/2017 Johnson ............... B64C 39/024
2008/0054121 A1 * 3/2008 Yoeli .................... B64C 1/1415
                                                                 244/12.1

* cited by examiner

HELIPLANE CRAFT

BACKGROUND OF THE INVENTION

1. Field of the Invention

The present invention is in the field of piloted aircraft and pertains particularly to an electrically powered, aerodynamic, heliplane craft.

2. Discussion of the State of the Art

In the field of aviation, airplanes and helicopters still represent the most used small aircraft carrying one to four passengers. An airplane typically needs a runway to take off and land because it flies horizontally and gets lift according to the standard fixed wing horizontally oriented profile. A helicopter may lift off vertically and may set down vertically. A helicopter is better able to navigate ground landing spots because of the ability of hovering.

Typically, aviation fuel is required to power airplane and helicopter engines. A helicopter also requires a vertical rotary rudder propeller system to help steer and prevent dipping and rolling. Other drawbacks associated with fixed wing aircraft and helicopters include high design and manufacture costs and high mechanical maintenance costs and requirements. Still other drawbacks include complexity of controls and associated training costs.

Industry leaders in aviation design and research and development have begun manufacturing drone-type passenger pods that are powerful enough to carry parcels and passengers, however, these systems are vertically oriented and stay vertical in all flight patterns. A passenger pod system is run from a distributed network of central control stations as a mass transportation system and passengers may not take control of the aerial vehicle while it is in route to a per-programmed destination. Moreover, current heliplane crafts are often sophisticated (operationally) and dedicated military craft that are complex in design and structure having features common to rotatory aircraft and jet airplanes. The goal of a heliplane design is to enable a single aerial vehicle to hover, make pin-point vertical landings and lift-offs, and to enable the much faster lateral speeds of fixed wing aircraft.

Therefore, what is clearly needed is an electrically powered, aerodynamic heliplane craft that reduces, mitigates, or eliminates the drawbacks listed above associated with current art craft.

BRIEF SUMMARY OF THE INVENTION

In an embodiment of the invention an aircraft is provided, comprising a substantially cylindrical body having a longitudinal axis, enclosing a cockpit having seating and controls for a pilot with the pilot's upper body oriented in the direction of the axis of the cylindrical body, a first and a second set of counter-rotating propellers of an overall diameter substantially greater than a maximum diameter of the body, positioned at an upper extremity of the cylindrical body, a first direct-current (DC) motor powering the first propeller set, and a second DC motor powering the second propeller set, a battery compartment at a lower extremity of the cylindrical body, enclosing a DC battery assembly of a capacity to drive the first and second DC motors for a substantial time, a first fixed wing having a wing flap on a lower edge, affixed to the cylindrical body and extending a substantial distance away from the cylindrical body in a first direction, a second fixed wing having a wing flap on a lower edge, affixed to the cylindrical body and extending a substantial distance away from the cylindrical body in a second direction, at an angle of between one-hundred and twenty and one-hundred and eighty degrees from the first direction, a rudder in a plane parallel to the axis of the cylindrical body, positioned at the lower extremity of the body and extending away from the cylindrical body, the plane of the rudder bisecting the angle between the first and the second direction of the wings, landing struts extending from a lower and outer extremity of each wing and of the rudder, the landing struts each extending parallel to the axis of the cylindrical body, the lower extremity of the three struts defining a plane orthogonal to the axis of the body, providing a support structure for the aircraft, and controls operable to move the rudder and the wing flaps, and to manage power and rpm of the counter rotating propellers. With the aircraft supported on the struts with the axis of the body vertical, powering and driving the propellers causes the aircraft to lift vertically, and with the aircraft rising vertically at a sufficient speed, operating the wing flaps in a particular manner causes the aircraft to transition from vertical to substantially level flight, particular management of power to the propellers and the wing flaps in substantially level flight, together with the weight of the body, cargo and batteries causes the aircraft to transition to vertical orientation, and further management of power to the propellers causes the aircraft to lose altitude vertically until again landing on and supported by the struts.

In one embodiment the wings extend in directions at a one-hundred and twenty-degree angle. Also, in one embodiment the controls are manually operable controls available to a pilot in the cockpit in the aircraft. Also, in one embodiment the controls are computer operated by an onboard computer executing software on a processor and sensing flight conditions. In one embodiment the aircraft further a hollow nose cone above the counter-rotating propeller sets. And in one embodiment the aircraft further comprises one or more windows and a doorway in the cockpit.

DETAILED DESCRIPTION OF THE INVENTION

In various embodiments described in enabling detail herein, the inventor provides a unique heliplane craft that may fly in a vertical position for takeoff, landing, and for attaining slower speeds and that may fly in a sufficiently horizontal position when attaining higher speeds associated with a fixed wing aircraft. The present invention is described in enabling detail using the following examples, which may describe more than one relevant embodiment falling within the scope of the present invention.

Figure 1:
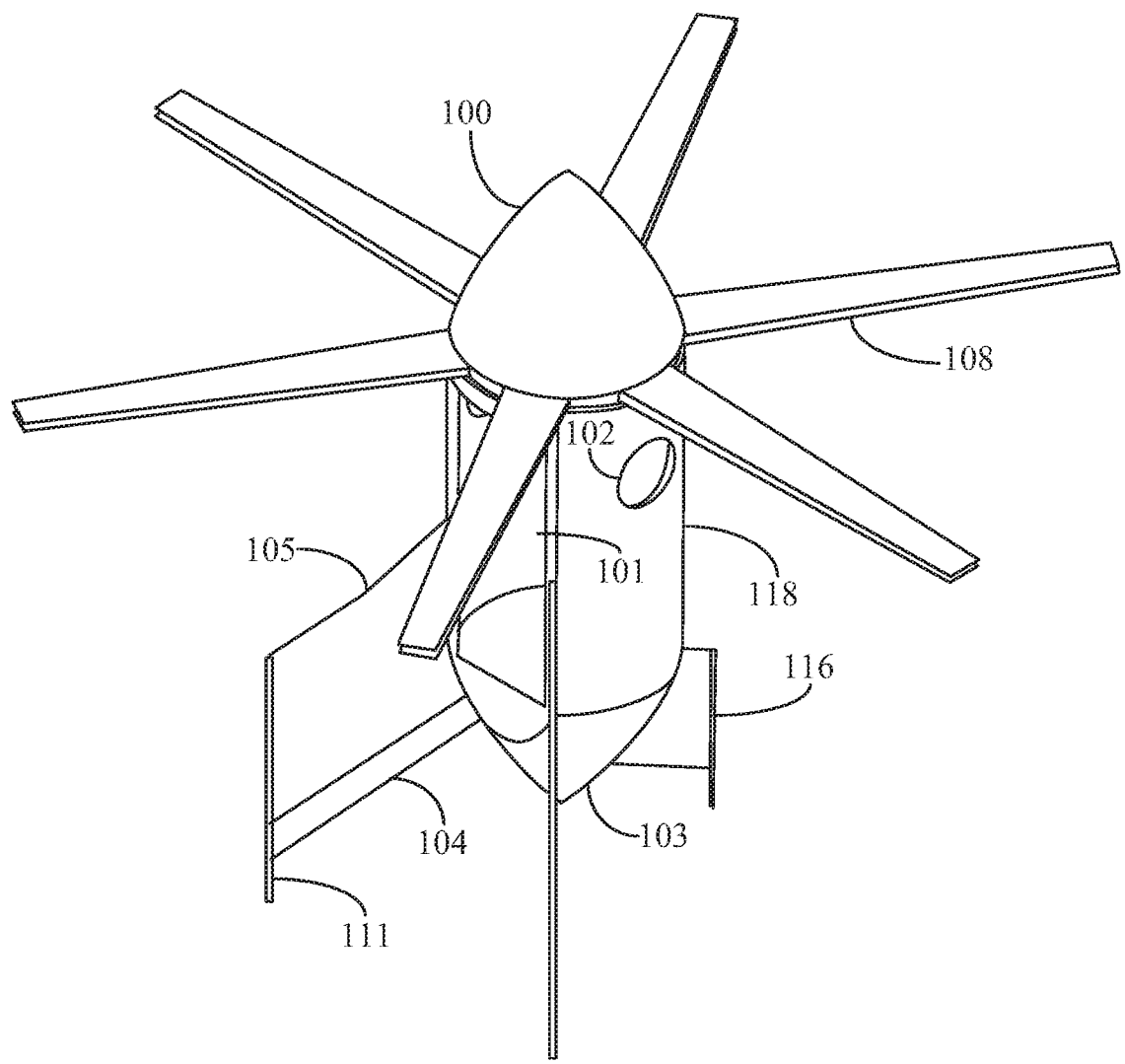
FIG. 1 is a top perspective view of an electric heliplane craft according to an embodiment of the present invention.

FIG. 1 is a top perspective view of an electric heliplane craft according to an embodiment of the present invention. The term heliplane refers generally to a group of aerial crafts that combine the vertical lift and seat, hovering, and navigation capabilities of a helicopter and aerodynamic lift and horizontal travel speeds of a fixed wing aircraft. The heliplane of the invention is depicted herein as having a generally cylindrical fuselage 118. Fuselage 118 may be manufactured of carbon fiber and may support a layer of insulation to maintain comfort within the protected space. Fuselage 118 is mechanically connected to at least one all electric rotor blade assembly having several blades 108 to provide lift and direction of travel (with navigation control) in a fashion like a helicopter.

A hollow nose cone 100 is fixed at one end of fuselage 118, extending beyond the plain of the rotor blades characterized herein by element number 108. In one embodiment, rotor blades 108 are driven by at least one direct current (DC) motor powered by several batteries. In this embodiment, rechargeable batteries may be used to drive rotor blades 108. In one application the batteries are Tesla EV™ batteries stored in a hollow rear compartment 103 at the end of fuselage 118 opposite of nose cone 100.

Battery compartment 103 is configured of a same or similar hollow conical design as nose cone 100 for aerodynamic purpose. Access to batteries in battery compartment 103 may be provided through the floor of a separation wall between the fuselage and the battery compartment, and or, from the outside of the battery compartment such as through a hatch door or the like. In one embodiment, battery compartment 103 may hold 16 Tesla EV™ rechargeable batteries.

Fuselage 118 may include an internal cockpit that takes up much or most of the internal volume of the fuselage. An entrance/exit doorway 101 to the internal cockpit of the heliplane may be provided to open from the outside and from the inside. A door is not depicted herein but may be assumed present in the form of a hatch style (hinged) doorway 101. In one embodiment doorway 101 may be a sliding latch door without departing from the spirit and scope of the invention. Fuselage 118 may also include one or more passenger windows 102. Windows for the heliplane of the invention may be manufactured of a strong shatter proof plexiglass or aviation approved window glass. The internal passenger compartment (volume within fuselage) may include a floor and a ceiling defined at the base ends of nose cone 100 and conical battery compartment 103.

The heliplane craft of the invention includes two fixed wings 105 having wing flaps 104 defining the trailing edges thereof. Wings 105 function to set the heliplane craft upright during higher forward flight speed. Wing flaps 104 may be controlled automatically by flight SW or by operable controls within the cockpit that may be accessible to the pilot. At higher speed, turning flaps 104 downward provides lift to the trailing end of fuselage 118, righting the craft for horizontal travel. The heliplane craft of the invention includes a vertical axis rotational rudder 116 to help turn fuselage 118 left or right. Rotation of the vertical rudder 116 may be performed by rotating a flight control stick to the left (counterclockwise) or to the right (clockwise).

Rudder 116 may be rotated about an axis while in flight. While landing, rudder 116 may be brought in configuration with the two fixed wings 105 to achieve a three-point landing apparatus. Landing pins 111 are provided at the ends of the fixed wings and at the end of the rudder to keep the wings and rudder from touching the ground. Landing pins 111 may be approximately 10 inches or so in length and may culminate at large landing feet (not illustrated) without departing from the spirit and scope of the invention.

In a preferred embodiment, landing pins 111 may include shock absorbing components such as spring shocks. In one embodiment, landing pins 111 may be individually adjusted for length to mitigate a landing on a slope or on slightly uneven ground. Typically, the length adjustments may be made at landing or just after to stabilize the craft. In one embodiment, optical recognition SW may be provided at landing wherein length adjustments to landing pins 118 may be made based on optical data just before the three-point landing.

Figure 2:
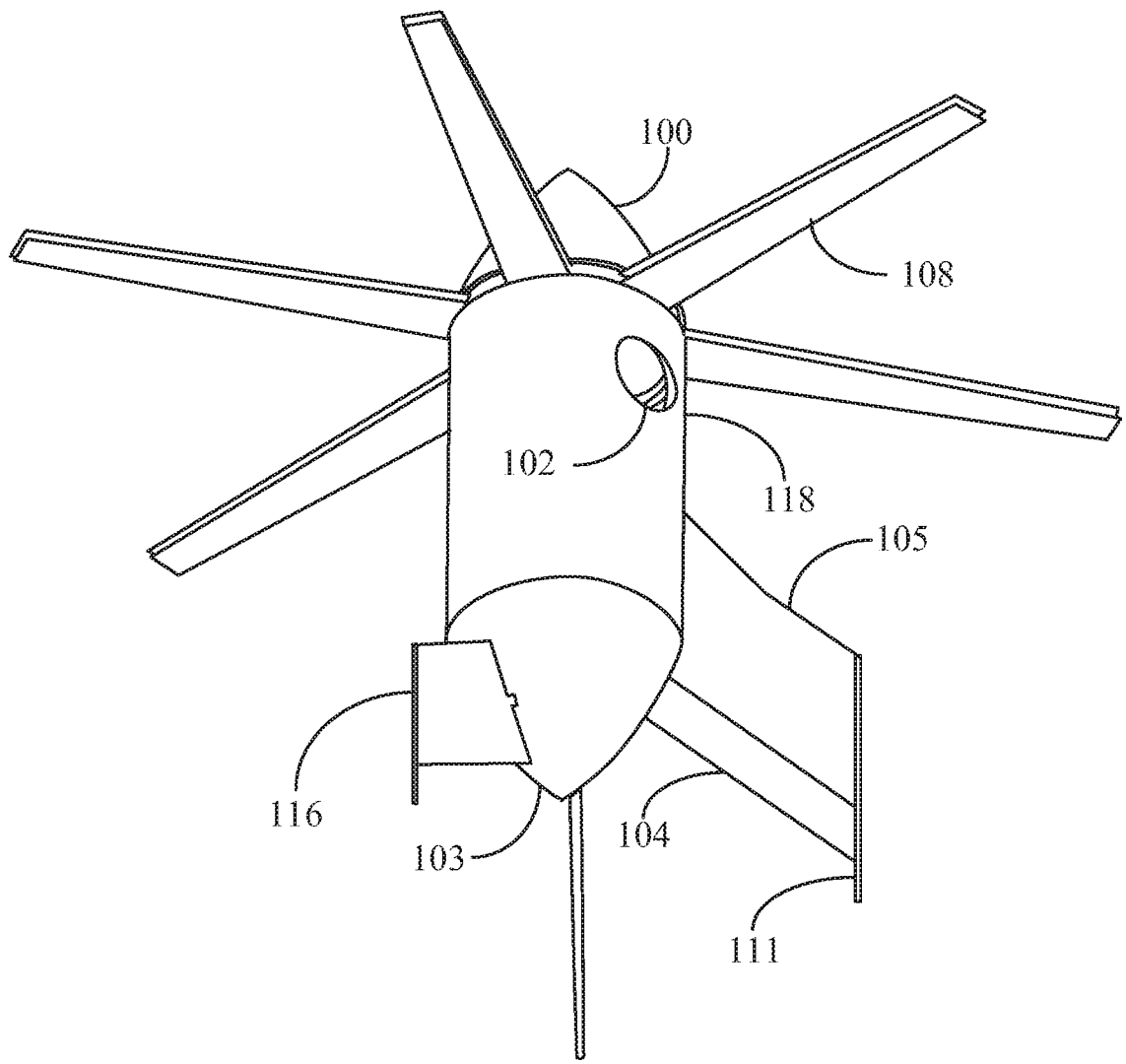
FIG. 2 is a bottom perspective view of the electric heliplane craft of FIG. 1.

FIG. 2 is a bottom perspective view of the electric heliplane craft of FIG. 1. In this view of the heliplane craft, fuselage 118 hangs down in vertical flight in a pendulum-like manner lowering the center of gravity of the craft and making the craft more stable in flight. Although it is not illustrated in this example, power lines from batteries inside battery compartment 103 may be run through the wall of fuselage 118 (double insulated wall) or on the inside wall thereof to power two DC motors (not illustrated) driving blades 108.

The heliplane of the present invention may be designed to provide enough cockpit space for one pilot and perhaps one co-pilot or passenger. In one embodiment, the heliplane of the invention may be expanded in fuselage diameter and in blade length to carry three or four persons or a mix of persons and cargo. In this embodiment, heliplane blades 108 are ducted blades (two levels that are counter-rotating) powered by two DC motors, one for each propeller of blades.

For a smaller craft carrying one to four persons including the pilot, the blade circumference may be approximately 12 feet in diameter or larger. In this embodiment, blades 108 may be approximately 4 feet in length. In this example, there may be 12 blades, 6 blades per propeller.

Figure 3:
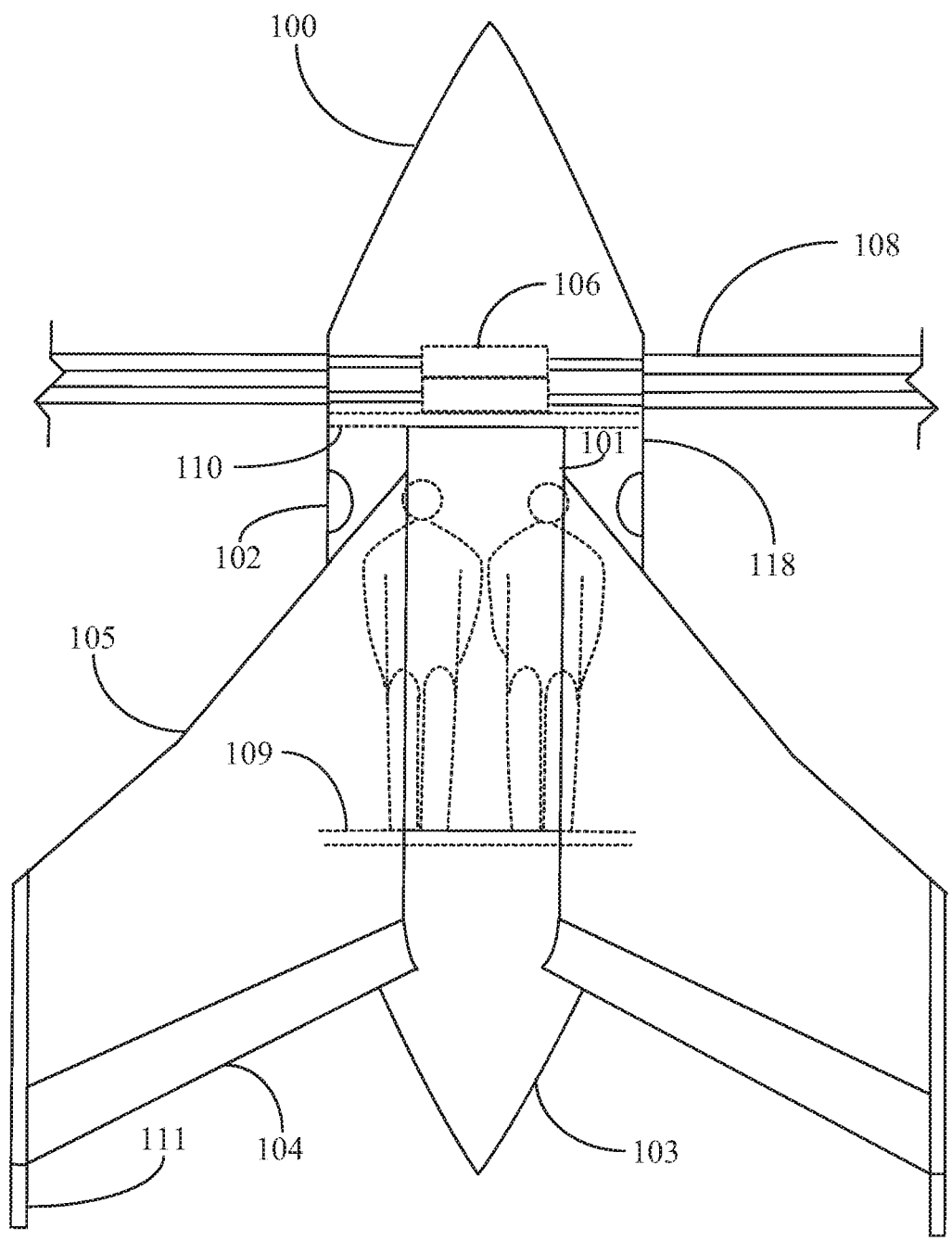
FIG. 3 is a front elevation view of the electric heliplane craft of FIG. 1.

FIG. 3 is a front elevation view of the electric heliplane craft of FIG. 1. In this view of the heliplane of the invention, the two fixed wings 105 are visible. This view may represent the top of the heliplane flying horizontally at a higher speed. Flaps 104 may be manipulated by SW to provide upward lift by turning flaps down to begin flying horizontally at a higher forward speed. Flaps 104 may be turned up when flying horizontally to gain altitude and down to ascend.

A pilot may use a control stick to level off power and slow the heliplane down to a point where it begins flying vertically again. Doorway 101 represents a means to enter and exit the heliplane craft as described further above. The cockpit depicts two persons (broken outline) that may be seated in the cockpit. The floor of the cockpit is represented herein by floor level 109. The ceiling of the cockpit is represented herein by ceiling level 110. The floor (109) and ceiling (110) form the closed ends of fuselage 118. The overall height of the cockpit (distance between floor level 109 and ceiling level 110) may be about six feet.

Windows 102 are partly visible to the left and right of the occupants. Direct current motors 106 (two each) are configured to rotate counter to one another. DC motors 106 may be centrally located in the propellers just above the ceiling level 110 of the cockpit. Nose cone 100 may house specific electronics such as positional sensors, radar, lights, flight recorder, and other components associated with flight dynamics, location dynamics, flight stability, collision avoidance, etc. The overall length of the heliplane of the present invention may be about 18 feet from the tip of nose cone 100 to the end of landing pins 111 (three each).

Figure 4:
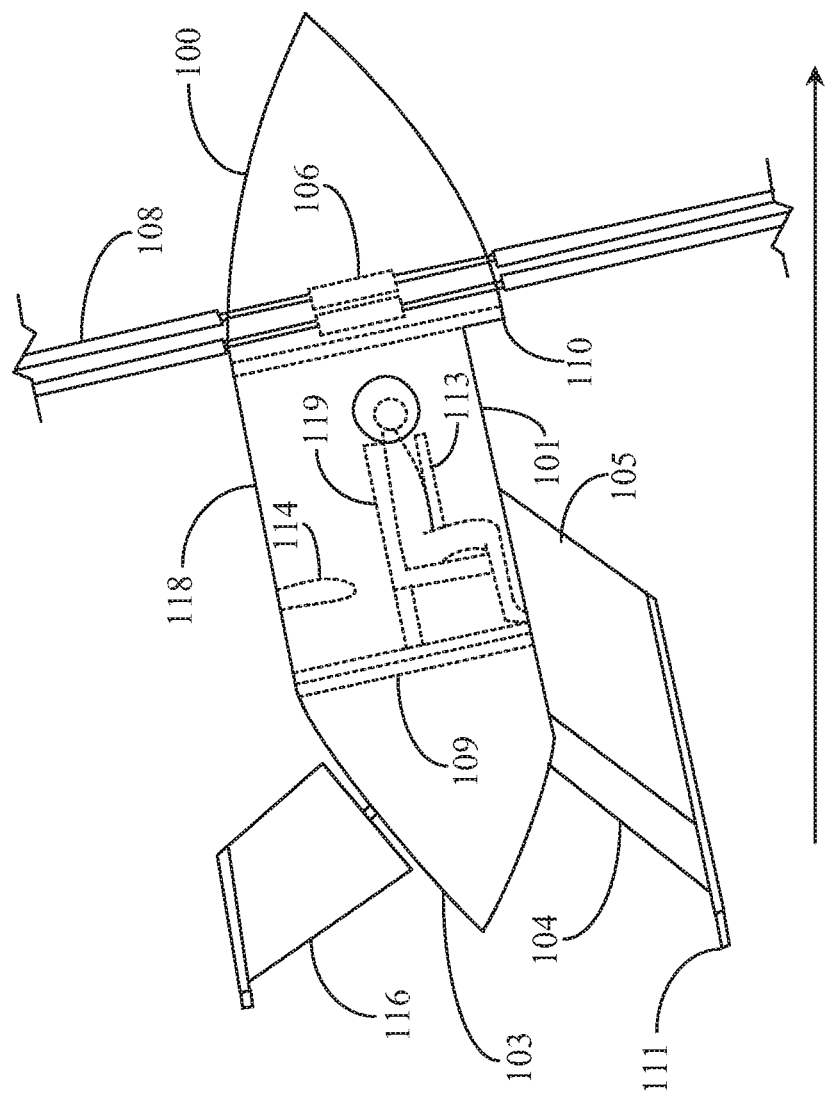
FIG. 4 is a side elevation view of the electric heliplane craft of FIG. 1.

FIG. 4 is a side elevation view of the electric heliplane craft of FIG. 1. In this view, the heliplane of the present invention is depicted on a near horizontal flight path relative to the depicted horizontal directional arrow. Wings 105 are seen below the fuselage 118. Rudder 116 is positioned atop conical battery compartment 103 where batteries are stored. Rudder 116 is positioned in line with wings 105 in a three-point configuration. Rudder 116 may be rotated to bank the craft to the left (left turn) or to the right (right turn).

In this view, a single pilot (broken boundary) is depicted in the cockpit in a seated position approximately head level to window 102. A seat 119 provides a secure seat from which to pilot the heliplane craft of the invention. In this embodiment, a chest bed 113 is provided as a retractable rest for the pilot to rest on in the horizontal flight position. In one embodiment, a head and chin rest apparatus may also be provided. These components may be retractable or removable components and may be retracted or removed when the heliplane craft is flying vertically like a helicopter.

Figure 5:
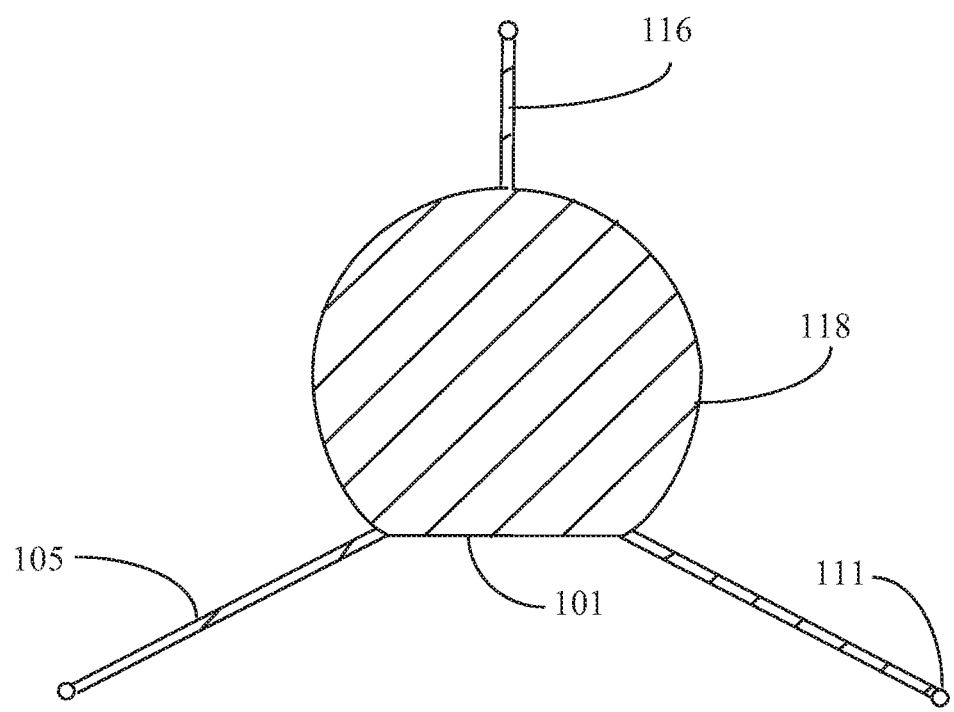
FIG. 5 is a sectional view of the electric heliplane craft of FIG. 1 depicting landing apparatus.

FIG. 5 is a sectional view of the heliplane craft of FIG. 1 depicting landing apparatus. In this sectional view, a horizontal profile for horizontal flight is depicted with fixed wings 105 positioned on either side of fuselage 118. Rudder 116 occupies top center wherein the angular disbursement is approximately 120 degrees apart. In this embodiment doorway 101 has a hinged door opening to the outside of fuselage 118. In another embodiment, doorway 101 is arcuate and has a sliding door in the wall of the fuselage 118 with the same nominal radius as the fuselage. The benefit of an arcuate door is that more space is available in the cockpit. Landing pins 111 are basically separated by 120 degrees to form a three-point landing apparatus. One with skill in the art will appreciate that landing pins 111 may culminate in landing feet that are designed for a specific type of landing and the expected landing terrain.

Figure 6:
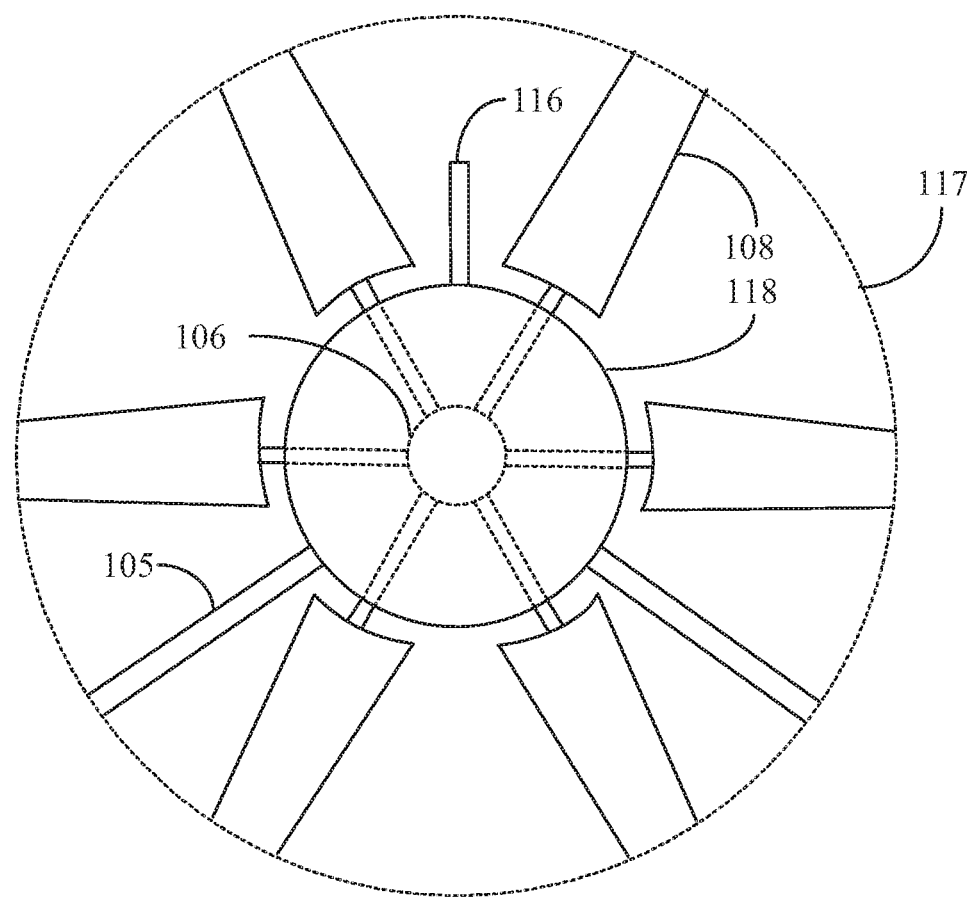
FIG. 6 is an overhead view of the electric heliplane craft of FIG. 1.

FIG. 6 is an overhead view of the electric heliplane craft of FIG. 1. In this overhead view of the heliplane craft of the invention, blades 108 are ducted via a duct 117 defining the circumference of the propellers. In one embodiment, DC motors 106 each support a propeller of blades 108 bonded by duct 117. In a variation of this embodiment, the number of blades 108 may be held at an odd number such as five blades, 7 blades, etc. In one embodiment, blades 108 are connected directly to motor shafts driven by the DC motors 106. In another embodiment, they may be connected through reduction gearing.

In this view, the position of wings 105 are depicted as is the position of rudder 116. Although not visible in this view the position of a pilot within the cockpit is facing toward the bottom of this view between wings 105. In one embodiment, the duct diameter is approximately 12 feet. The counter-rotating DC motors 106 support propellers with variable pitch four-foot-long blades 108. Other dimensional configurations may be observed without departing from the spirit and scope of the invention. For example, a smaller heliplane craft may have capacity for a single person (pilot), while a larger heliplane craft may accommodate up to four persons including a pilot. Blades 108 may be pitch adjustable in one embodiment and may be fabricated from light weight metal alloys like an aluminum or magnesium alloy. Other light weight but durable materials may be used without departing from the spirit and scope of the invention.

Figure 7:
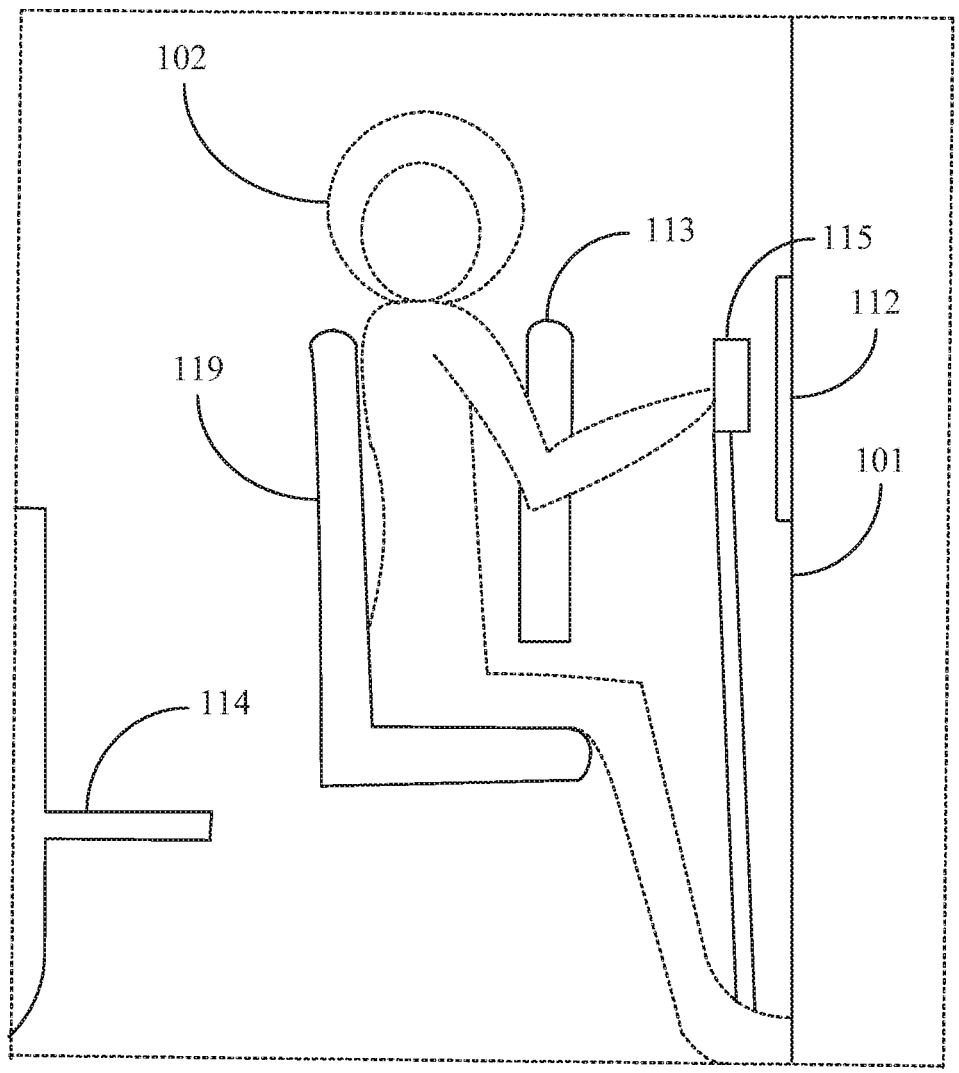
FIG. 7 is an enlarged view of a cockpit area of the electric heliplane craft of FIG. 1.

FIG. 7 is an enlarged view of the cockpit of the electric heliplane craft of FIG. 1. The cockpit space available is essentially equal to the available volume within fuselage 118. A pilot is represented herein by a broken boundary line form sitting on a seat 119. A chest rest device 113 may be provided to help stabilize the pilot during horizontal flight. Device 113 may be retracted or otherwise removed and replaced as needed. In one embodiment, chest rest 113 includes a head and chin rest (not illustrated).

In this embodiment, the pilot uses a flight control stick 115 to control normal flight operations including turning left and right, ascending, and descending while flying vertical. Control stick 115 may also control horizontal flight including banking left or right, ascending, and descending. In one embodiment control stick 115 is used to power up by raising the control stick handle upward and power down by sliding the joystick handle back downward.

The pilot may also use control stick 115 to change the angle of wing flaps to raise the bottom end of the fuselage during transition from vertical flight mode to faster horizontal flight mode. In one aspect, the pilot pushes control stick 115 forward to lower flaps and pulls back on it to raise flaps. In a preferred embodiment, the pilot at least may have passenger windows aligned at about head level when seated. Window 102 may be approximately 18 inches in diameter. Other windows may also be provided such as a front window and back window. In one embodiment, the fuselage includes a 360-degree transparent window section enabling a pilot to see out in any direction. Mechanics of control stick 115 may include a stop mechanism that prevents the control stick from drifting if no one is currently touching it.

In one embodiment, a rear seating arrangement 114 may be provided typically behind the pilot or pilot copilot team. In one embodiment seating may be fold-able, retractable, or may be removed when not required. In one embodiment, cargo holds, platforms, bins, or other cargo securing apparatus may be installed when required to carry produce, delivery items, mail, or any other commodity that requires shipment from one point to another.

A pilot operating the heliplane craft of the present invention may have access to a computer system including an information display screen 112 that is readily visible to the pilot but not obstructing of pilot view. In one embodiment, the computer system controls a flight guidance system that may be transitioned to for automatic piloting functions allowing the pilot to relinquish control of the craft to the flight guidance system. In this mode, features such as lidar or radar may be provided to enable timely reaction to potential collisions with other aerial vehicles.

In one embodiment the heliplane craft of the invention may be operated by a pilot operating a control stick like control stick 115 wherein the computer system is in conjunction with the pilot controlling some aspects of flight. For example, the pilot could increase craft speed with the intention of flying horizontal and the computer system may automatically turn down the wing flaps 104 at the appropriate air speed. Wing flaps 104 and rudder 116 may be placed under control of the computer system for stabilization according to the flight guidance system that may incorporate real-time conditions like high wind causing turbulence, shifting or cross winds, or heavy rain, sleet, hail, or snow.

In one variation of the aspect of shared flight control between the pilot and computer system supporting display 112, the computer system may provide a virtual pilot view on display 112 when visibility is very poor. In one embodiment where pilot views may be rendered on screen 112 in real time, the views may be changed by the pilot, for example switching from forward flight view to landing view for example. Although not illustrated in this example, a radio communications system may be provided in the form of powered communications equipment enabling the pilot to radio landing points, airport towers, other aerial vehicles, or other control stations as is typical of manned aircraft.

In one aspect of the present invention, the automated pilot portion of the computer system software may take over from manual flight operation by the pilot at the directive of the pilot. In a variation of this embodiment while flying on automatic pilot, a remote human operator may take over automatic pilot and manually fly the heliplane craft from a remote but nearby control station. In such as embodiment, the remote operator may be a landing spot controller and may direct a heliplane craft to a landing point and land the craft without pilot assistance. Moreover, the remote operator may also direct lift off and movement to a safe airspace before returning control of the heliplane craft over to auto pilot where the pilot might then take control.

In one embodiment, the computer system may monitor flight performance by the pilot when in manual flight operating mode. In this mode the computer system may be authorized to seize control of the heliplane craft of the invention should the pilot become compromised or should the pilot be exhibiting poor flight skills indicating some problem.

Figure 8:
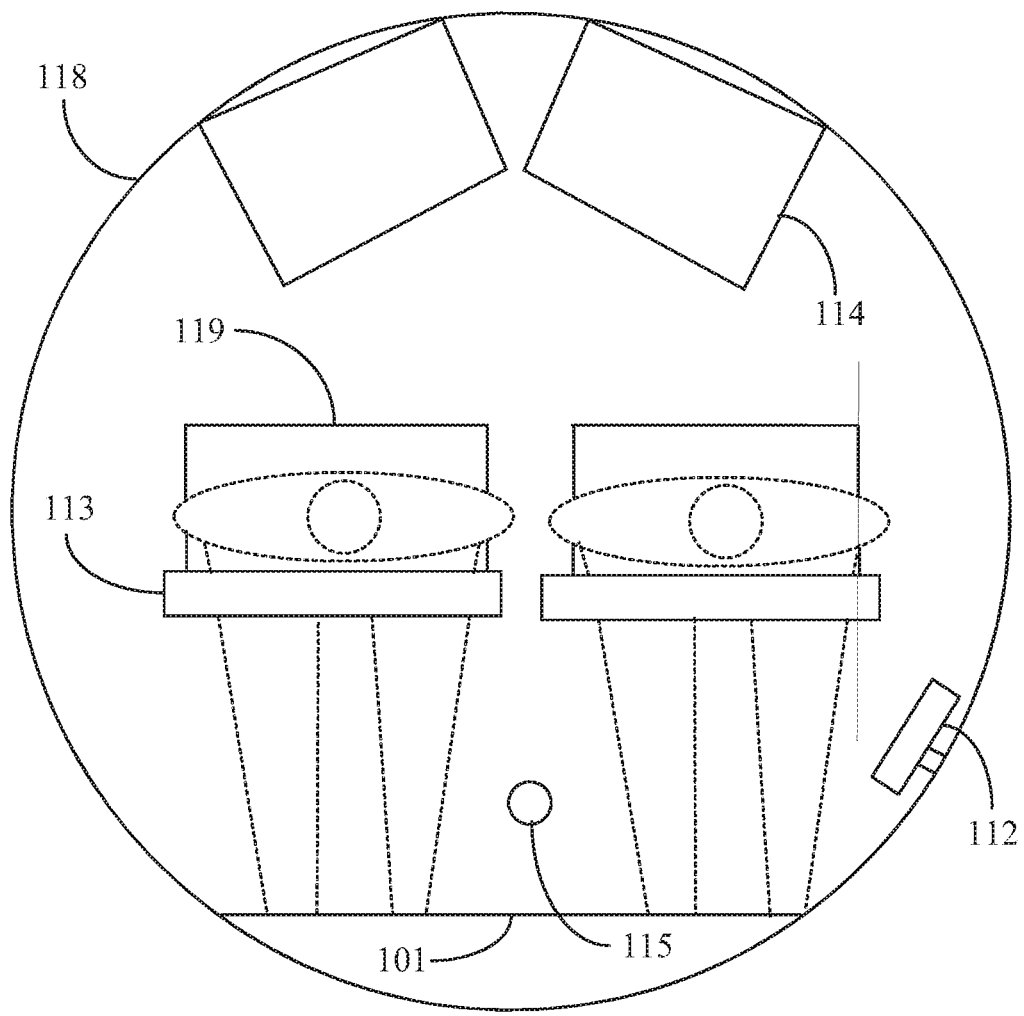
FIG. 8 is an overhead view of the cock pit area of the electric heliplane craft of FIG. 7.

FIG. 8 is an overhead view of the cockpit of the heliplane craft of FIG. 7. In this embodiment, fuselage 118 has a large enough diameter to provide a cockpit that may accommodate four individuals two in front seating arrangement 119 and two (passengers) in back seating arrangement 114. Computer system display 112 is visible to at least the pilot of the heliplane craft of the invention.

Doorway 101 may have a hinged door that opens the cockpit to the outside for entrance and exit of the heliplane craft. Chest rest devices 113 help to keep the individuals in seating arrangement 119 (two seats) comfortable in a horizontal flight position and are only required for that purpose. In one embodiment, individuals in seating arrangement 114 also have access to a chest rest device (one per seat) though none are depicted in this example for seating arrangement 114.

In this example, one flight control stick 115 is provided at center of the two individuals, either of which could pilot the craft using control stick 115. In one embodiment, the two individuals in seating arrangement 119 may both be pilots wherein one is a main pilot and the other is a copilot. In this embodiment, there may be two flight control sticks disbursed to the center space of each potential pilot. Also, in this embodiment, one pilot may relinquish control of the craft to the other pilot. In a variation of this embodiment, the two control sticks are tandem control levers that control one flight system so either control stick may be used. In another variation of the embodiment, the control sticks are independent of one another but either may be used to control the single flight system while the other is not connected for control.

There may be more than one computer display devices such as computer display 112 mounted within the cockpit without departing from the spirit and scope of the present invention. Moreover, in an embodiment where up to three passengers are present, passengers may have access to an entertainment system that may include display of video and audio. In one embodiment, fuselage 118 includes ample window space for both pilots to view the flight path and surroundings, and for passengers to view the surroundings as well. In one embodiment, at least a portion of fuselage 118 includes a 360-degree window section enabling a 360-degree view around the fuselage. There are many possibilities. Areas of outside of the craft that cannot be viewed from the inside of the craft like directly above or directly below the craft (vertical flight) may be captured in real time through an imaging system and viewed on computer display 112.

Chest rest devices 113 may be ergonomically designed with facilities adapted for head or chin rest, free space for arm movement to operate control flight stick 115, and quick connections for setting and locking the chest rests into position and taking them down or retracting them from active rest position when not needed. In one embodiment, seating arrangement 119 may be connected as one unit having two seats and may be rotated about a lateral pivot axis to maintain an upright position for the pilots when the heliplane craft transitions to horizontal flight.

Figure 9:
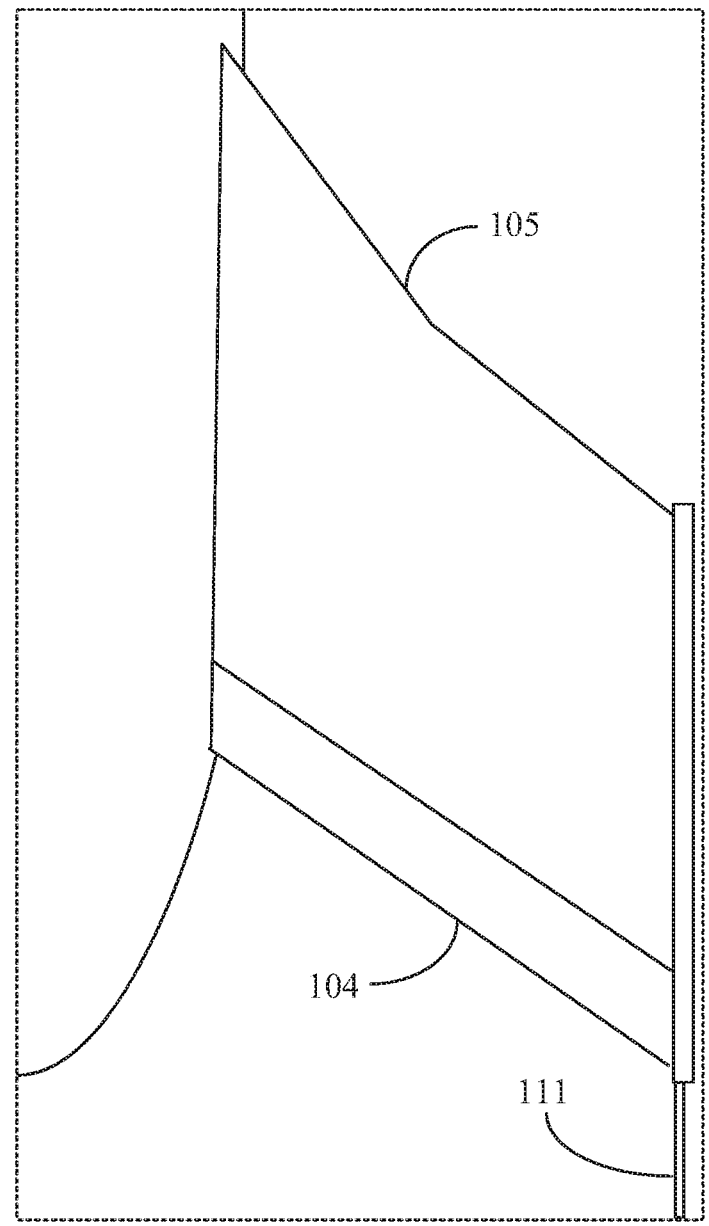
FIG. 9 is an enlarged elevation view of a landing pin of the electric heliplane craft of FIG. 1

FIG. 9 is an enlarged elevation view of a landing pin of the electric heliplane craft of FIG. 1. Landing pin 111 (three total) is telescopic to the extent that it may be length-adjusted to help keep the heliplane craft of the invention stable in pitch when landed. Landing pin 111 is also equipped with a shock absorption mechanism like spring shocks or hydraulic shocks to absorb landing impact. In one embodiment, landing is typically directed to a landing pad or otherwise level and safe landing area. In one embodiment, pins 111 include landing feet to help stabilize the landing of a craft where ground is soft, marshy, uneven, etc.

It will be apparent to one with skill in the art that the heliplane craft of the invention may be provided using some or all the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will also be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

I claim:

1. An aircraft, comprising:
   a substantially cylindrical body having a longitudinal axis, enclosing a cockpit having seating and controls for a pilot with the pilot's upper body oriented in the direction of the axis of the cylindrical body;
   a first and a second set of counter-rotating propellers of an overall diameter substantially greater than a maximum diameter of the body, positioned at an upper extremity of the cylindrical body;
   a first direct-current (DC) motor powering the first propeller set, and a second DC motor powering the second propeller set;
   a battery compartment at a lower extremity of the cylindrical body, enclosing a DC battery assembly of a capacity to drive the first and second DC motors for a substantial time;

a first fixed wing having a wing flap on a lower edge, affixed to the cylindrical body and extending a substantial distance away from the cylindrical body in a first direction;

a second fixed wing having a wing flap on a lower edge, affixed to the cylindrical body and extending a substantial distance away from the cylindrical body in a second direction, at an angle of between one-hundred and twenty and one-hundred and eighty degrees from the first direction;

a rudder in a plane parallel to the axis of the cylindrical body, positioned at the lower extremity of the body and extending away from the cylindrical body, the plane of the rudder bisecting the angle between the first and the second direction of the wings;

landing struts extending from a lower and outer extremity of each wing and of the rudder, the landing struts each extending parallel to the axis of the cylindrical body, the lower extremity of the three struts defining a plane orthogonal to the axis of the body, providing a support structure for the aircraft; and controls operable to move the rudder and the wing flaps, and to manage power and rpm of the counter rotating propellers;

wherein with the aircraft supported on the struts with the axis of the body vertical, powering and driving the propellers causes the aircraft to lift vertically, and with the aircraft rising vertically at a sufficient speed, operating the wing flaps in a particular manner causes the aircraft to transition from vertical to substantially level flight, particular management of power to the propellers and the wing flaps in substantially level flight, together with the weight of the body, cargo and batteries causes the aircraft to transition to vertical orientation, and further management of power to the propellers causes the aircraft to lose altitude vertically until again landing on and supported by the struts.

2. The aircraft of claim 1 wherein the wigs extend in directions at a one-hundred and twenty-degree angle.

3. The aircraft of claim 1 wherein the controls are manually operable controls available to a pilot in the cockpit in the aircraft.

4. The aircraft of claim 1 wherein the controls are computer operated by an onboard computer executing software on a processor and sensing flight conditions.

5. The aircraft of claim 1 further comprising a hollow nose cone above the counter-rotating propeller sets.

6. The aircraft of claim 1 further comprising one or more windows and a doorway in the cockpit.

* * * * *